United States Patent [19]
Niwayama

[11] Patent Number: 5,502,369
[45] Date of Patent: Mar. 26, 1996

[54] STABILIZED DIRECT CURRENT POWER SUPPLY

[75] Inventor: Masaki Niwayama, Hyogo, Japan

[73] Assignee: Mitsubishi Denki Kabushiki Kaisha, Tokyo, Japan

[21] Appl. No.: 468,915

[22] Filed: Jun. 6, 1995

Related U.S. Application Data

[63] Continuation-in-part of Ser. No. 955,068, Oct. 1, 1992, abandoned.

[30] Foreign Application Priority Data

Oct. 1, 1991 [JP] Japan .................................. 3-253753

[51] Int. Cl.⁶ .................................................. G05F 1/56
[52] U.S. Cl. .................................... 323/273; 323/280
[58] Field of Search .................................. 323/273, 274, 323/280, 281, 299, 328, 349

[56] References Cited

U.S. PATENT DOCUMENTS 4,560,918 12/1985 Callen ................................ 323/273
4,847,546 7/1989 Bobier et al. ........................ 320/21
4,884,160 11/1989 Pasquarella .......................... 361/18
5,274,323 12/1993 Dobkin et al. ...................... 323/280

FOREIGN PATENT DOCUMENTS 2053702  4/1971  France.
3914287  6/1991  Germany.
64-88612 4/1989  Japan.

Primary Examiner—Peter S. Wong
Assistant Examiner—Adolf Berhane

[57] ABSTRACT

A stabilized direct current power supply includes a switching device for selecting DC stabilization operation of the chopper type in the operation mode, in which heating and power consumption in an electronic device could cause a problem, in order to soften the problem. Alternatively the switching device selects DC stabilization operation of the linear control type not generating noise in the operation mode, in which noise for the electronic device circuit could introduce a problem, but heating and power consumption causes no problem. Further, the power supply uses a series transistor common to both types of DC stabilization operation.

23 Claims, 11 Drawing Sheets

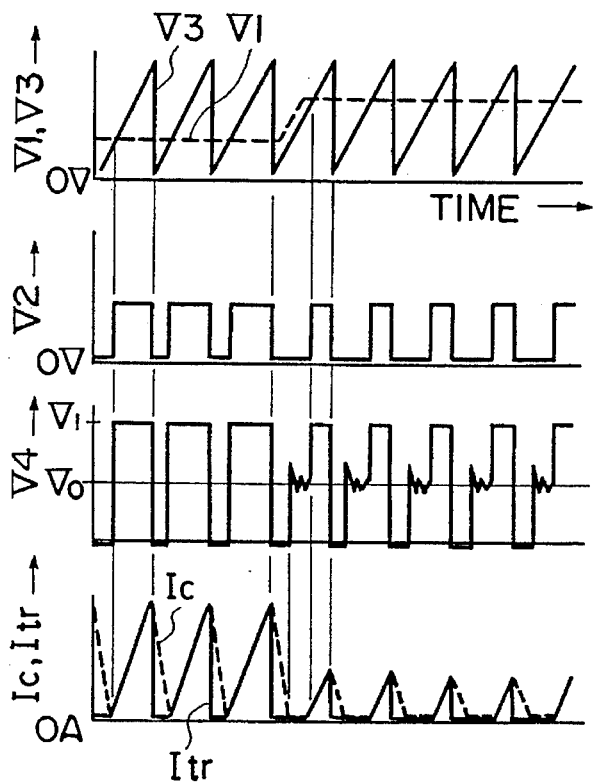
FIG. 4a PRIOR ART
FIG. 4b PRIOR ART
FIG. 4c PRIOR ART
FIG. 4d PRIOR ART
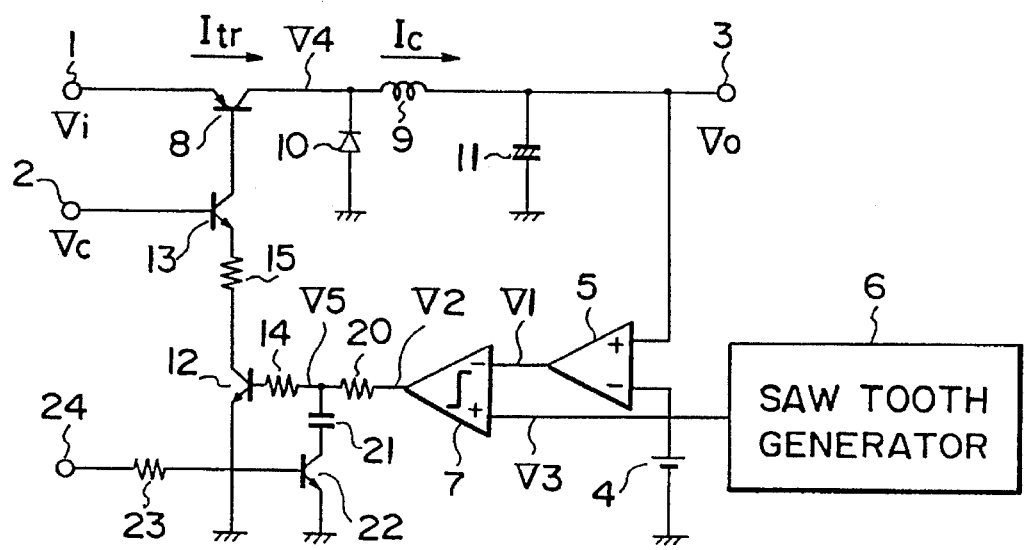
FIG. 6

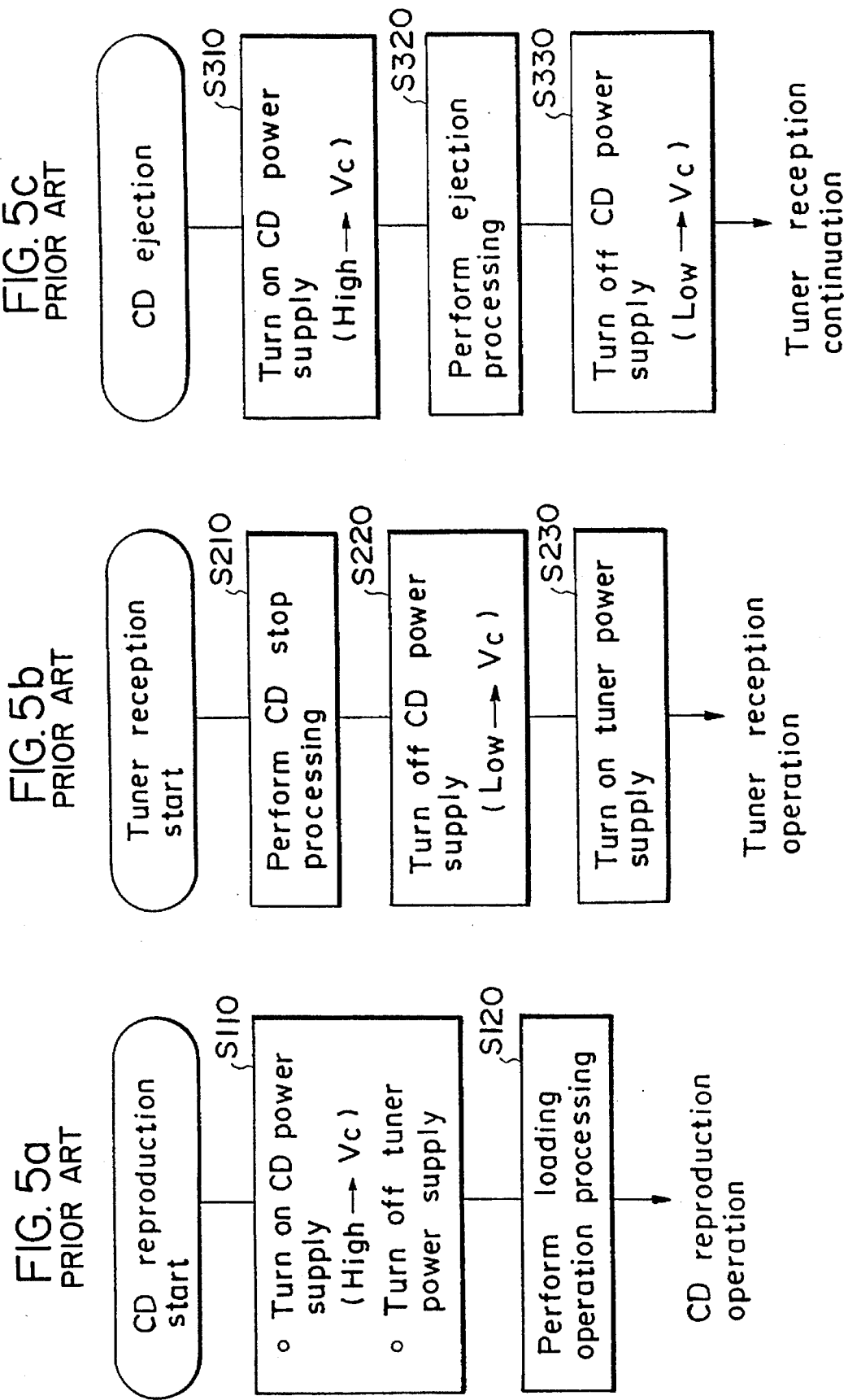

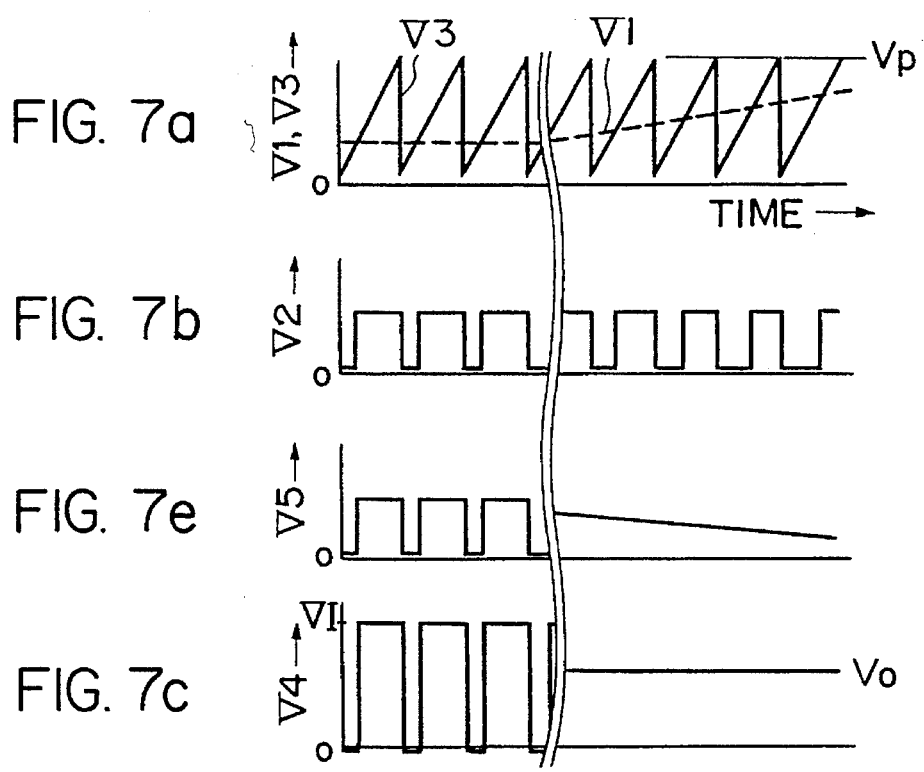
FIG. 7a
FIG. 7b
FIG. 7e
FIG. 7c
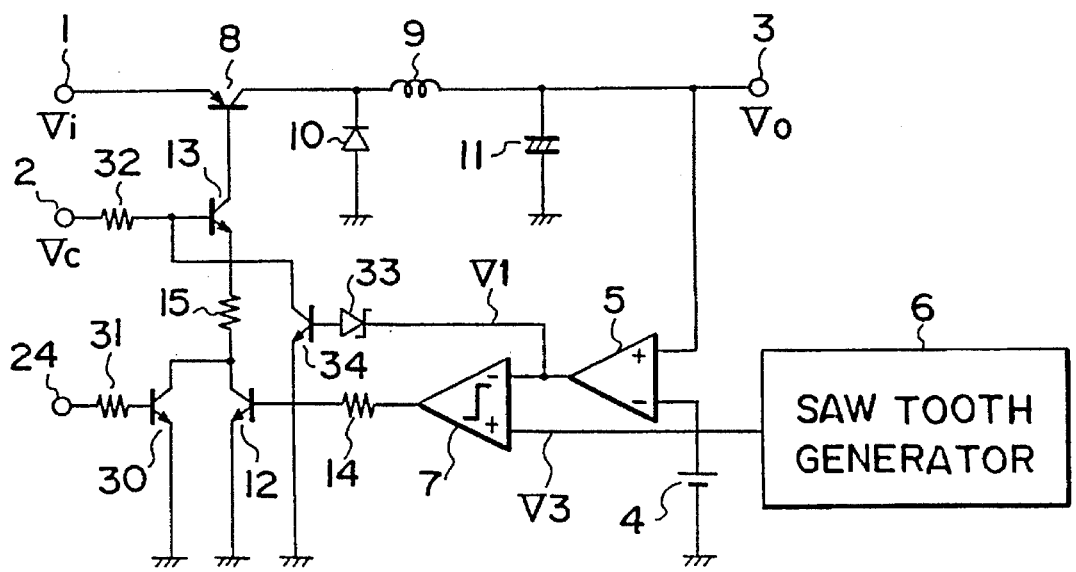
FIG. 8

| | OPERATING STATE | CONTROL SIGNALS | | | OPERATION MODE OF CD POWER SUPPLY |
|---|---|---|---|---|---|
| | | TUNER POWER SUPPLY CONTROL LINE | CD POWER SUPPLY CONTROL LINE | SOUND SELECTOR | |
| 1 | CD REPRODUCTION WITHOUT FM MULTIPLEX RECEPTION | LOW (OFF) | HIGH (ON) | LOW (CD) | CHOPPER |
| 2 | FM SOUND REPRODUCTION ONLY | HIGH (ON) | LOW (OFF) | HIGH (FM) | LINEAR |
| 3 | FM SOUND REPRODUCTION AND CD EJECTION | LOW | HIGH | HIGH | LINEAR |
| 4 | CD REPRODUCTION AND FM MULTIPLEX RECEPTION | HIGH | HIGH | LOW | CHOPPER |

FIG. 15

ND CURRENT POWER
SUPPLY

STABILIZED DIRECT CURRENT POWER SUPPLY

This application is a continuation-in-part, of application Ser. No. 07/955,068 filed on Oct. 1, 1992, now abandoned.

BACKGROUND OF THE INVENTION

1. Field of the Invention

This invention relates to a stabilized direct current (DC) power supply of the switching type for application to an electronic device. More particularly, it relates to a stabilized direct current (DC) power supply of the switching type for application to an electronic device which contains a circuit sensitive to noise and a power supply handling large power in a single cabinet.

2. Description of the Prior Art

The above-mentioned electronic device often adopts a stabilized direct current (DC) power supply of the switching type (hereinafter referred to as switching regulator) as a power supply for the internal circuitry. The switching regulator can provide a desired power supply efficiently because of its principles, and produces a great effect on reducing power consumption or heating of the device.

Referring now to FIGS. 1 to 4, the prior art is described by taking as an example an onboard tuner and compact disk (DC) player unit 1 contained in a single cabinet.

FIG. 1 is a block diagram centering around a power supply for an onboard tuner and CD player unit adopting a switching regulator, wherein numeral 100 is a power input terminal of a car battery power supply to the electronic device into which normally a voltage of about 13 V is fed. Numeral 101 is a tuner power supply for supplying stabilized DC power to a tuner circuit 102, numeral 103 is an external antenna of the device, and numeral 104 is an antenna input terminal which is connected to the tuner circuit 102.

Numeral 105 is a CD power supply for supplying the first stabilized power (herein, 7 V for description) to a CD player block and is a power supply circuit of the switching type. Output of this power supply is used as power of a spindle motor circuit which gives a rotation driving force to a disk (not shown).

Numeral 106 is a CD 5-V power supply for supplying the second stabilized power (herein, 5 V for description) to the CD player block. The CD 5-V power supply is a normal stabilized power supply (called a series regulator) using a linear amplifier.

Numeral 107 is a digital signal processing circuit, shown as a typical circuit block of a CD player, which demodulates signals read from a disk and corrects errors (detailed description of operation is omitted); the circuit receives power from the CD 5-V power supply 106 for operation.

Numeral 108 is a loading motor as a driving source of a disk loading and ejecting mechanism, and numeral 109 is a motor drive circuit which controls forward and reverse rotations of a loading motor 108 and uses output of the CD a power supply 105 as power supply for operation.

Numeral 110 is a centralized controller which consists of a microprocessor, etc., and controls tuner operation and CD player operation intensively. Numeral 111 is a tuner power supply control line for instructing output of the tuner power supply 101 to be turned ON or OFF and numeral 112 is a CD power supply control line for instructing output of the CD power supply 105 to be turned ON or OFF and is given the signal name $V_c$ for description. Numeral 113 represents loading control lines for instructing operation of the loading motor 108. All the control line signals are output from the centralized controller 110.

FIG. 2 is a schematic drawing of the disk loading mechanism of the tuner and CD player unit, wherein the same part is designated by the same reference numeral in FIG. 1. In FIG. 2, numeral 200 is a cabinet of the tuner and CD player unit, numeral 201 is a compact disk (hereinafter simply disk), and numeral 202 is an operation panel.

The disk 201 is mounted on a tray part 203 for conveying to the inside or outside of the cabinet 200.

Rotation of the loading motor 108 is propagated via a belt 204, a spur gear 205, and a rack part 206 fixed to the tray part 203 and the tray part can be moved to the inside or outside of the cabinet 200 in response to the rotation direction of the loading motor 108. Numeral 207 is a disk clamp mechanism provided to hold the disk 201 on a turn table (not shown) during reproduction operation (detailed description is omitted).

FIG. 3 is a drawing showing a specific configuration example of the CD power supply 105 shown in FIG. 1, wherein the same parts are designated by the same reference numerals in FIGS. 1 and 2. The switching regulator shown in FIG. 3 is a step-down regulator of the chopper type (output voltage is lower than input voltage). In FIG. 3, numeral 1 is a power input terminal into which voltage $V_i$ (which is 13 V in average and fluctuates from 10 V to 16 V or so) is fed, and numeral 2 is a power ON/OFF terminal to which the CD power supply control line 112 for controlling ON/OFF of regulator output is connected and the signal $V_c$ is applied. This example assumes that $V_c$=5 V to perform normal operation and $V_c$=0 V to instruct output stop. Numeral 3 is an output terminal of the power supply from which the voltage $V_o$ is output.

Numeral 4 is a reference voltage, numeral 5 is an error amplifier which detects and amplifies the difference between the reference voltage 4 and output voltage $V_o$, numeral 6 is a saw tooth generator, and numeral 7 is a PWM converter which performs PWM conversion by comparing the saw tooth signal v3 from the saw tooth generator with the output v1 of the error amplifier 5. Numeral 8 is a series transistor whose emitter is connected to the power input terminal 1 and whose collector to the output terminal 3 via a choke 9, numeral 10 is a diode, and numeral 11 is a smoothing capacitor connected between the connection point of the choke 9 and the output terminal 3 and ground; these are basic circuit elements of a switching regulator of the chopper type.

Numerals 12 and 13 are drive transistors and numerals 14 and 15 are current setting resistors; these make up a drive circuit which transmits output of the PWM converter 7 to the series transistor 8. The current setting resistor 14 is connected between the output terminal of the PWM converter 7 and the base of the drive transistor 12. Between the base of the series transistor 8 and ground, the drive transistor 13, the current setting resistor 15, and the drive transistor 12 are connected in series in order.

The power ON/OFF terminal 2 (voltage is $V_c$) is $V_c$ is 0 V, the drive transistor 13 is completely cut off connected to the base of the drive transistor 13. When and at the same time, the series transistor 8 is also cut off, causing output of the power supply to become 0 V (OFF).

When V is 5 V, the drive transistor 13 operates as a common base amplifier. In this state, when output of the PWM converter 7 is low, the drive transistor 12 is turned OFF and at the same time, the drive transistor 13 and series transistor 8 are also turned OFF. When output of the PWM converter 7 is high, the drive transistor 12 is turned ON and a specific emitter current flows into the drive transistor 13; resultantly, the series transistor 8 is also turned ON.

FIGS. 4a–4b show the waveforms of the blocks of the stabilized DC power supply of the chopper type shown in FIG. 3. Using the drawing, operation of the description to follow assumes that the voltage $V_c$ of the circuitry shown in FIG. 3 will be described. The power ON/OFF terminal 2 is 5 V. FIG. 4a shows waveforms of output V3 of the saw tooth generator 6 (solid line) and of output V1 of the error amplifier 5 (broken line). It shows an example in which since load current lowers from the latter half of the time axis, the output voltage $V_o$ rises. The PWM converter 7 compares the two signals shown in FIG. 4a and outputs the signal V2 shown in FIG. 4b. FIGS. 4a and 4b show that when the output voltage $V_o$ is high, the high duty of the output V2 of the PWM converter 7 lowers.

When the output V2 is high, the series transistor 8 is turned ON and during this period, the voltage V4 of the collector of the series transistor 8 becomes $V_I$ which is substantially equal to the input voltage $v_i$, as shown in FIG. 4c. While the transistor is ON, the current $I_c$ of the choke 9 (broken line in FIG. 4d) and the collector current $I_{tr}$ of the serial transistor 8 (solid line in FIG. 4d) increase with the time.

On the other hand, when the series transistor 8 is OFF, the collector voltage V4 is dropped because of the nature of retaining the previous current of the chopper 9, and the collector voltage V4 is clamped at a place of slightly negative voltage because of function of the diode 10 (FIG. 4c). While the transistor is OFF, the choke current $I_c$ decreases with the time for a while as shown in FIG. 4d, but current supply is continued to the output side.

In the latter half of the time axis in FIG. 4, that is, when the output voltage $V_o$ rises the ON duty of the series transistor 8 lowers. Accompanying this, the average value of the choke current $I_c$ output through the choke 9 to the output terminal 3 also lowers as shown in FIG. 4d, and stabilization operation is performed so as to lower the output voltage $V_o$. Generally, 20 kHz to 500 kHz are selected as switching frequencies at a stabilized power supply of the switching type. Recently, high-speed switching devices are provided and switching frequencies of 100 kHz or higher are often selected to obtain merits of miniaturization.

Operation of the former tuner and CD player unit which contains the switching regulator of the chopper type described above will be described below by using flowcharts shown in FIGS. 5(a) to 5(c).

To newly reproduce the disk 201, the disk 201 is mounted on the tray part 203. In FIGS. 5(a), when reproduction start operation input by an operation key on the operation panel 202 (not shown) is received, in step S110 the centralized controller 110 sets the CD power control line 112 (signal name $V_c$) high (that is, sets $V_c$ to 5 V). This signal is fed into the CD power supply 105, switching regulator operation is performed, and the output ON state is entered. This energizes all circuit blocks related to the CD player. At the same time, the output OFF state is specified for the tuner power supply 101 through the tuner power supply control line 111.

Next, in step S120 the centralized controller 110 outputs a specific signal to the loading control line 113, drives the loading motor 108 through the motor drive circuit, brings the tray part 203 into the inside of the cabinet 200, and completes loading operation (loading operation processing).

After the loading operation terminates, signals are read from the disk 201 and reproduction operation is performed by other devices (not shown). Power required for the CD player block is almost supplied from the CD power supply 105. Since this power supply is of the switching type, extra heating from the power supply block can be minimized and a temperature rise in the inside of the cabinet 200 can be suppressed to be low.

Next, FIG. 5(b) is used to describe processing of the centralized controller 110 when tuner reception is instructed by operation (not shown) during disk reproduction. The centralized controller 110 instructs predetermined CD player block stop operation in step S210, and with the disk 201 mounted in the inside of the cabinet 200, finally placing the CD power supply 105 in the output OFF state in step S220. On the other hand, the tuner power supply 101 is changed to the output ON state through the tuner power supply control line 111, enabling the tuner circuit to operate.

Next, FIG. 5(c) is used to describe processing of the centralized controller 110 when disk ejection operation (not shown) is performed during tuner reception. The centralized controller 110 places the CD power supply 105 in the output ON state in step S310 while continuing tuner reception operation. In step S320, the centralized controller drives the loading motor 108 in the reverse rotation to the loading time and ejects the tray part 203 or disk 201 (ejection processing) through the loading control line 113 and motor drive circuit 109. When the tray part 203 moves to a specific ejection end position, the centralized controller 110 instructs output of the CD power supply 105 to be turned OFF in step S330.

The following problem arises for a sequence of the operation steps of the tuner and CD player unit described above: If the CD power supply 105, that is, a power supply of the switching regulator type is operated for disk ejection operation, the power supply generates high-frequency noise at considerably large level. Specifically, the peripheral circuit is affected by electrostatic induction or electro-magnetic induction caused by pulse voltage and current of large amplitude or by direct invasion as a voltage drop at wiring impedance. Affection is liable to extend to the peripheral circuit because of recent high-frequency switching regulators.

The noise can be ignored unless the unit is in the tuner reception state; but in the reception state, noise is entered in the tuner circuit or antenna in the same cabinet and there is an extremely high risk the reception quality will lower. Depending on the situation, even in an acoustic system which contains a tuner in a separate cabinet, noise of switching power supply may cause the reception quality to be lowered.

To solve the problem, the following countermeasures should be adopted:

o1 Seal the switching regulator up in a sealed case.

o2 Provide a noise removing filter for the power input/output block, etc.

o3 Seal the tuner block up in a sealed case.

o4 Keep the tuner block apart from the switching regulator block.

o5 Lower or change the switching frequency of the switching regulator.

o6 Use a choke with less magnetic flux leakage.

If the noise problem is completely removed by combining these countermeasures easily and with a few number of parts and a slight cost increase, it is satisfactory. On the other hand, as an essential countermeasure, a series regulator with a normal line amplifier rather than a power supply of the switching type can be used to supply power to the motor drive circuit in order to solve the noise problem.

For this countermeasure, if a stabilized power supply of the switching type is adopted as the main power supply during reproduction operation of the CD player, a series regulator should be provided apart from it and at least when ejection operation is performed during tuner reception, only the series regulator should be operated for driving the loading motor.

Since the former stabilized DC power supply is configured as described above, if the switching regulator type is adopted, the countermeasures listed above in o1 to o6 must be combined for noise countermeasures. In fact, a large number of circuits, mechanisms, and features must be installed.

In a narrow space such as an onboard device, there are many restrictions on layout design of circuit blocks and shield design, and a satisfactory result based upon the aforementioned measures often cannot be obtained.

In addition, if a series regulator is used to supply power to the motor drive circuit, and a power supply to drive a motor handles a large power and current, then a semiconductor device for allowing a large heat loss is required. Such a device, which takes a large form, requires extra circuit installation space and parts cost.

From the viewpoints of circuit installation space, parts cost, and heat loss, the stabilized DC power supply whose regulator circuit is switched between a switching regulator and series regulator in an alternative way, disclosed in Japanese Patent Laid-Open No. Sho 64-88612, etc., is preferable. However, since it is switched in response to the input voltage level without respect to a harmful influence of noise, the power supply requires noise countermeasures as described above.

SUMMARY OF THE INVENTION

It is an object of the invention to provide a stabilized direct current power supply which exhibits a high-efficiency feature that a stabilized power supply of the switching type has in the operation state in which heating and power consumption in an electronic device can cause a problem, and can eliminate a noise problem essentially in the operation state in which noise that is a harmful influence of a stabilized power supply of the switching type introduces a problem, but heating and power consumption cause no problem.

To this end, according to the invention, there is provided a stabilized DC power supply which comprises a series transistor inserted in series between a power supply input terminal for inputting direct current power supply and an output terminal and switch means responsive to an operation mode of an electronic device for selecting either a state in which direct current stabilization of the chopper type is performed by switching the series transistor, or a state in which direct current stabilization of linear control type is performed by operating the series transistor as a linear amplifier.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 is a timing chart showing operation waveforms at blocks of the chopper type power supply circuit shown in FIG. 3;

FIG. 5 is a flowchart showing processing of a centralized controller of a former tuner and CD player unit;

FIG. 6 is a circuit diagram of one embodiment of a stabilized DC power supply according to the present invention;

FIG. 7 is a timing chart showing operation waveforms at blocks of the stabilized DC power supply shown in FIG. 6;

FIG. 8 is a circuit diagram of another embodiment of a stabilized DC power supply according to the present invention;

DETAILED DESCRIPTION OF THE PREFERRED EMBODIMENTS

Figure 1:
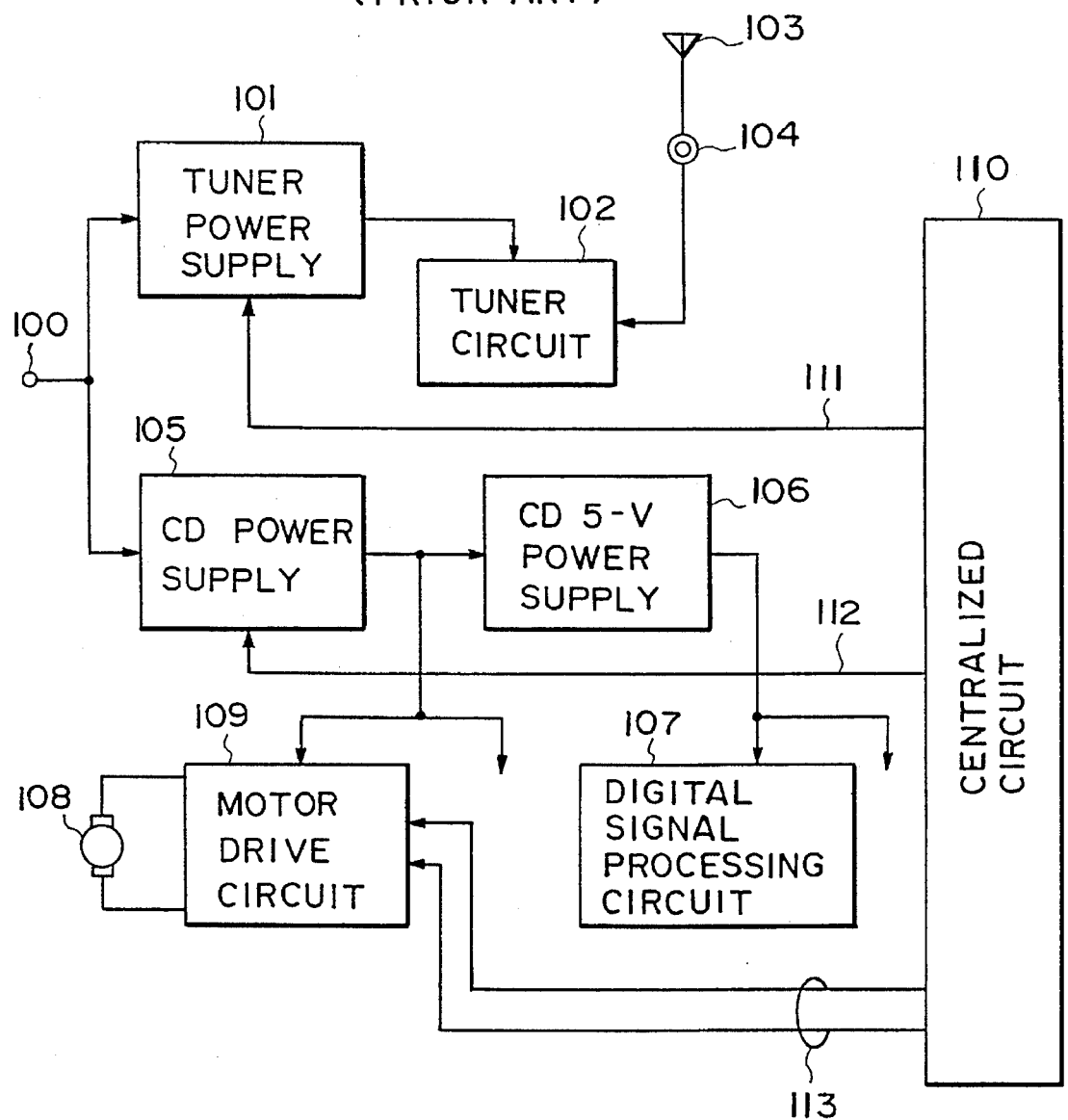
FIG. 1 is a block diagram for a power supply system of a tuner and CD player unit using a former switching type stabilized DC power supply.
Figure 2:
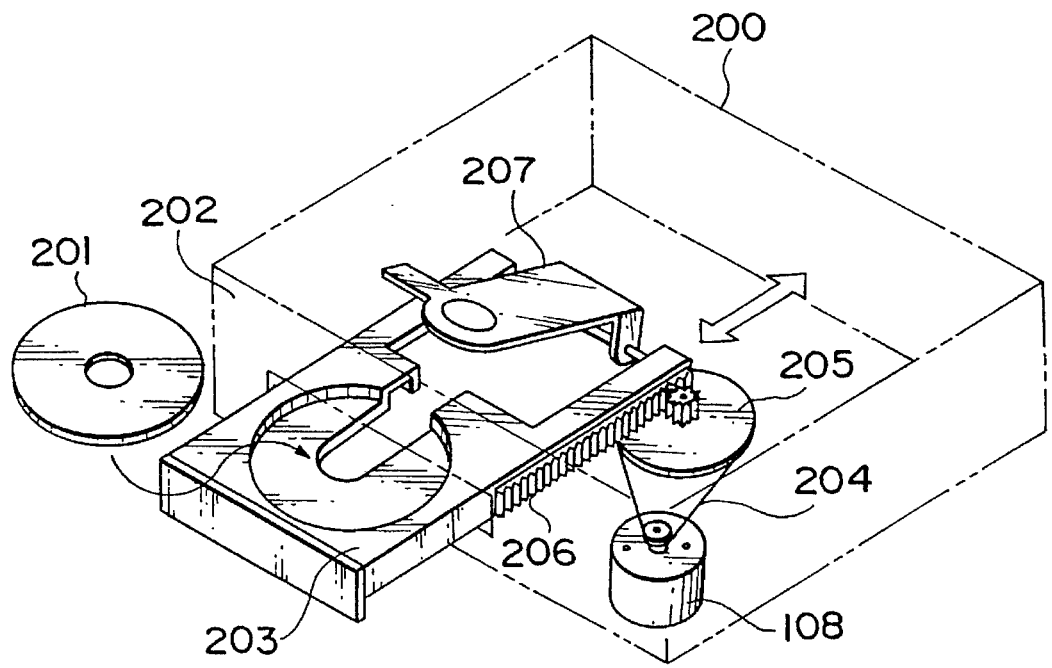
FIG. 2 is a schematic perspective drawing showing a configuration example of a loading mechanism of an information recording medium.

Referring now to the accompanying drawings, there are shown preferred embodiments of the invention.

The main principle of the stabilized DC power supply of the invention is to use a common series transistor for enabling selection of a step-down switching regulator of the chopper type or a series regulator performing a linear operation according to the operation mode of an electronic device. First, embodiments of the stabilized DC power supply providing two operation modes are described.

Embodiment 1:

One embodiment of the stabilized DC power supply having two operation modes is described using FIG. 6. In FIG. 6, the same parts are designated by the same reference numerals 1~15 in FIG. 3 and the description thereof is omitted. The elements designated by reference numerals 20 to 24 making up switch for switching the operation state are added in the circuit shown in FIG. 6 from the step-down stabilized DC power supply of the chopper type shown in FIG. 3.

In FIG. 6, numeral 20 is a smoothing resistor connected between the output terminal of a PWM converter 7 and one end of a current setting resistor 14; numeral 21 is a smoothing capacitor whose one end is connected to the connection point of the current setting resistor 14 and the smoothing resistor 20, and the smoothing capacitor 21 and the smoothing resistor 20 make up a high-pass cut filter as a smoothing circuit. Numeral 22 is a common-emitter type switch transistor whose collector is connected to the other end of the smoothing capacitor 21; numeral 23 is a current setting resistor used as a base resistor for the switch transistor 22; and numeral 24 is a mode specification signal of an electronic device which is fed into the base of the switch transistor 22 via the current setting resistor 23 and which takes a value of 0 V (low) to 5 V (high).

Figure 3:
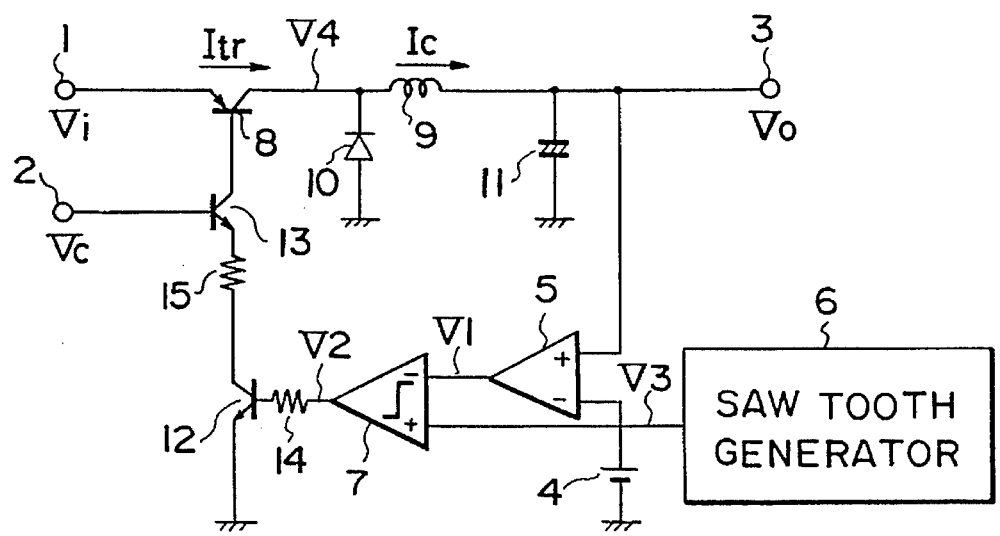
FIG. 3 is a circuit diagram of a former chopper type stabilized DC power supply.

Now, assuming that the mode specification signal is 0 V, the switch transistor is OFF and a pulse signal output from the PWM converter 7 is given to the base of a drive transistor 12. Thus, the same circuit operation as the former chopper type power supply shown in FIG. 3 is performed.

FIG. 7 shows waveforms at the blocks of the circuit shown in FIG. 6. In FIG. 7a, V1 is an output of an error amplifier 5 and V3 is an output of the saw tooth generator 6. In FIG. 7b, V2 is an output of the PWM converter 7. In FIG. 7e, V5 is a signal at the connection point of the smoothing resistor 20 and the smoothing capacitor 21. In FIG. 7c, V4 is a collector voltage of a series transistor 8. When the mode specification signal is 0 V, the switching operation state corresponds to the left half of FIGS. 7a, 7b, 7c, and 7e. In this case, the circuit is almost the same as that in FIG. 3, thus the waveforms at the blocks also become similar to those in FIG. 4 (correspond to the left half of FIG. 4). FIG. 7e shows the waveform of the signal V5 at the connection point of the smoothing resistor 20 and the smoothing capacitor 21. The signal is fed into the base of the drive transistor 12 via the current setting resistor 14.

On the other hand, when the mode specification signal is 5 V, the switch transistor 22 is turned ON and the high-pass cut filter (integration circuit) made up of the smoothing resistor 20 and the smoothing capacitor 21 becomes effective for the PWM wave output from the PWM converter (V2 in FIG. 7b).

Resultantly, filter output, that is, the signal V5 in FIG. 6 becomes an analog signal provided by averaging the PWM converter 7 output pulses (see the right half of FIG. 7e). The PWM converter 7 outputs power supply output voltage $V_o$ and reference voltage 4 pulses of duty conforming to the difference between the from its operation principles. Thus, the level of the signal V5 provided by smoothing the pulses also becomes a value conforming to the difference between the output voltage $V_o$ and reference voltage 4

Operation of the drive transistor into which the signal V5 is fed also becomes a linear amplification operation together with a drive transistor 13 and resultantly the series transistor 8 also performs linear operation. That is, the stabilized DC power supply operates as a linear series regulator.

The right half of FIGS. 7a, 7b, 7c, and 7e shows the signal waveforms at the blocks during linear operation. FIG. 7 shows how load current reduces with the time. In linear operation, no switching waveform appears in the waveform of the collector of the series transistor 8 (V4) and DC voltage substantially equal to the output voltage $V_o$ is observed.

In the embodiment, not all circuits of the stabilized DC power supply perform a linear operation. Some circuits perform a switching operation; these circuits handle small signals. The control element through which almost all output voltages are passed, that is, the series transistor 8 performs a linear operation and the noise generation degree is incomparably low as compared with normal switching regulators.

Embodiment 2:

Next, another embodiment of the stabilized DC power supply having two operation modes is described using FIG. 8. In FIG. 8, the same parts are designated by the same reference numerals 1~15 and 24 in FIGS. 3 and 6. In FIG. 8, numeral 30 is a common-emitter type switch transistor for switching the operation mode of the stabilized power supply; numeral 31 is a current setting resistor for setting base current of the switch transistor 30; and a mode specification signal 24 is applied to the resistor 31. The switch transistor 30 is connected in parallel to a drive transistor 12. Numeral 32 is a base resistor connected in series to the base of a drive transistor 13; numeral 33 is a Zener diode for level shift; and numeral 34 is a common-emitter type transistor amplifier. The Zener diode 33 is connected between the output terminal of an error amplifier 5 and the base of the transistor amplifier 34 and the collector of the transistor amplifier 34 is connected to the base of the drive transistor 13. For description, assume that the breakdown voltage $V_z$ of the Zener diode 33 is the same value of the peak voltage of output of a saw tooth generator 6 ($V_p$; see FIG. 7a).

Next, operation of the circuit shown in FIG. 8 will be described. Now, assuming that the mode specification signal 24 is 0 V, the switch transistor 30 is turned OFF. At this time, the same circuit as in FIG. 3 exists as a control loop of chopper type regulator. When the output voltage of the error amplifier 5 changes in the range of higher than the lower limit voltage of saw tooth wave to lower than the peak voltage $V_p$, the duty of output pulses of the PWM converter 7 becomes less than 100%. Sufficient stabilization operation is performed in this range unless power supply load changes rapidly.

On the other hand, Zener diode 33 ($V_z$ is selected as equivalent value to $V_p$) is connected to the base of the transistor amplifier 34, thus the transistor amplifier 34 is cut off unless the output voltage V1 of the error amplifier 5 exceeds the forward voltage in PN junction ($V_f$) added to the breakdown voltage $V_z$ of the Zener diode 33. Since the breakdown voltage $V_z$ of the Zener diode 33 is selected as an equivalent value to the saw tooth wave peak amplitude $V_p$ as described above, the base current of the transistor amplifier 34 does not flow and normally the transistor amplifier 34 is cut off.

When the mode specification signal is 5 V, the switch transistor 30 is turned ON and the same effect occurs as if the drive transistor 12 were always ON, thus the control loop of the chopper type is disconnected. In this state, first the series transistor 8 is always turned ON, attempting to rise the output voltage $V_o$. This causes the output V1 of the higher voltage than $V_z$ (Zener breakdown voltage) V (PN error amplifier 5 also to rise and finally to become junction forward voltage).

Then, collector current of the transistor amplifier 34 is generated and the base resistor 32 causes the potential of the base of the drive transistor 13 to lower. That is, a loop for linearly controlling the series transistor 8 functions from the error amplifier 5 to the transistor amplifier 34 to the drive transistor 13. If the amplification degree of the error amplifier 5 is large, a voltage of $V_o$, substantially equivalent to that as with the chopper type, is obtained even in the operation state of the linear control loop.

Figure 9:
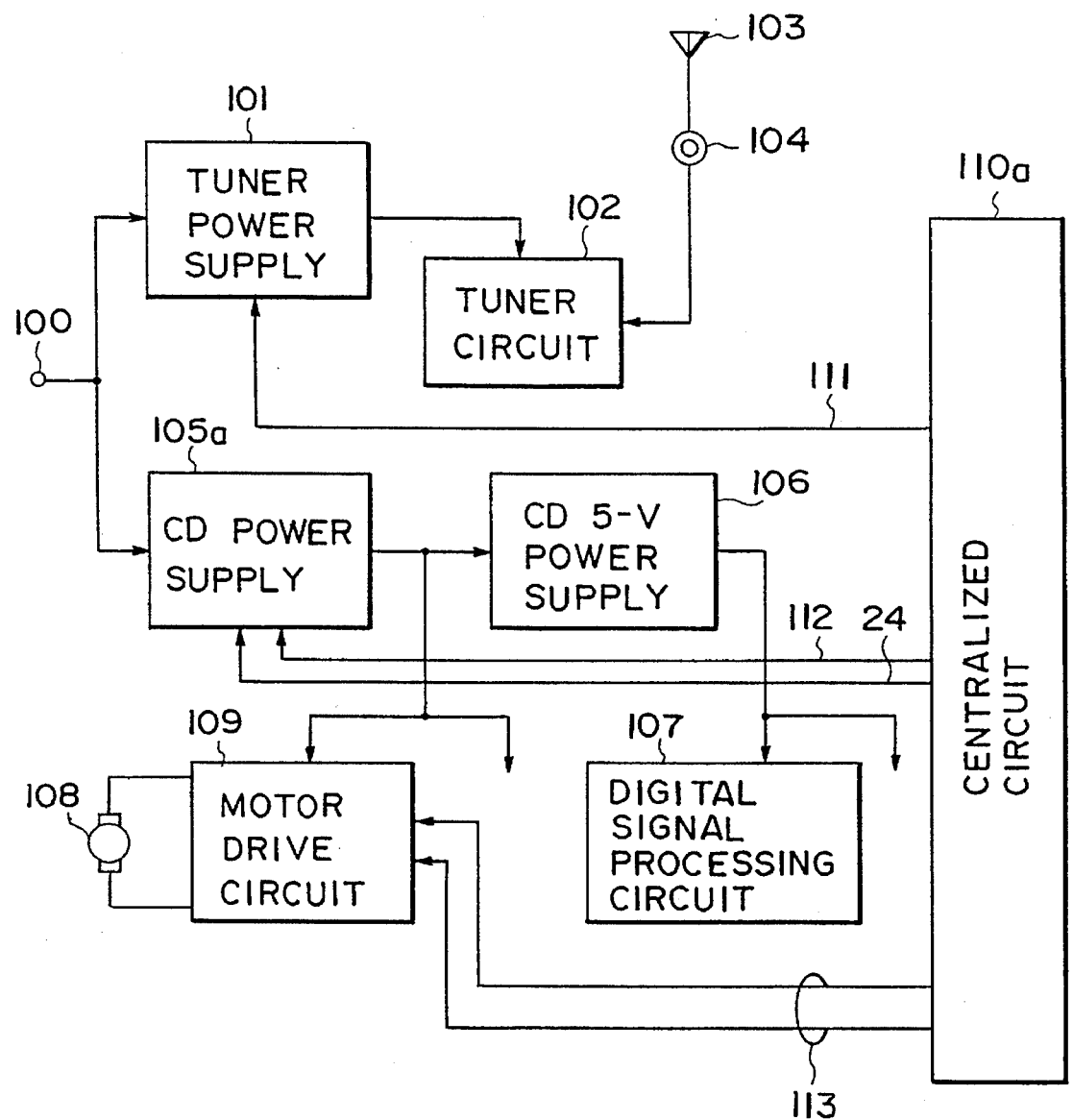
FIG. 9 is a block diagram for a power supply system of a tuner and CD player unit as one embodiment of applying a stabilized DC power supply of the present invention to an electronic device.

Embodiment 3:

Hitherto, embodiments of the stabilized DC power supply having two operation modes have been described. Given below are an application example of the embodiments of the stabilized DC power supply to actual electronic devices and an embodiment related to selection of the operation mode. In FIG. 9, the same parts are designated by the same reference numerals 100–104, 106–109, and 111–113 in FIG. 1. In FIG. 9, the stabilized DC power supply described in embodiment 1 or 2 is applied to a CD power supply 105a which replaces CD power supply 105 of a former electronic device, and a control line of a mode specification signal 24 to the CD power supply 105a is added to a centralized controller 110a which replaces centralized controller 110 of a former electronic device. Since the function handling it is added, the centralized controller 110a differs slightly from the centralized controller 110 shown in FIG. 1 in operation.

That is, if the mode specification signal 24 common to the circuit in FIG. 6 or 8 is set high (5 V), the stabilized power supply becomes the linear type; if the signal 24 is set low (0 V), the stabilized power supply becomes the chopper type.

In the former tuner and CD play unit example shown in FIG. 1, the CD power supply 105 operated as the chopper type regardless of whether the CD player was used in the reproduction state or was performing a loading or ejection operation.

In the tuner and CD player unit of the invention shown in FIG. 9, the operation mode is selected as follows:

(i) Linear type operation mode selected during a loading or ejection operation; otherwise, chopper type operation mode is selected.

As another embodiment, the operation mode is selected as follows:

(ii) Linear type operation mode only when an ejection operation is performed during tuner reception; otherwise, chopper type operation mode is selected.

The former example points out that if the chopper type regulator is operated during tuner reception, noise is entered in reception signals and there is a high risk the reception quality will lower. In this sense, the method (ii) can be used for a countermeasure. If the centralized controller 110a controls the tuner block and the CD player block totally, such a mode change can be made because whether or not a disk exists in the cabinet can be judged.

On the other hand, the method (i) is to simplify the mode change rule; if the linear operation mode is selected unconditionally for loading or ejection operation regardless of whether or not the tuner is receiving, the problem in the former example is solved. If there are specifications such that simply a disk is loaded into the cabinet and reproduction operation of the CD player block is not started, and that tuner reception is continued if the tuner is receiving, the method (i) becomes proper.

Figure 10A:
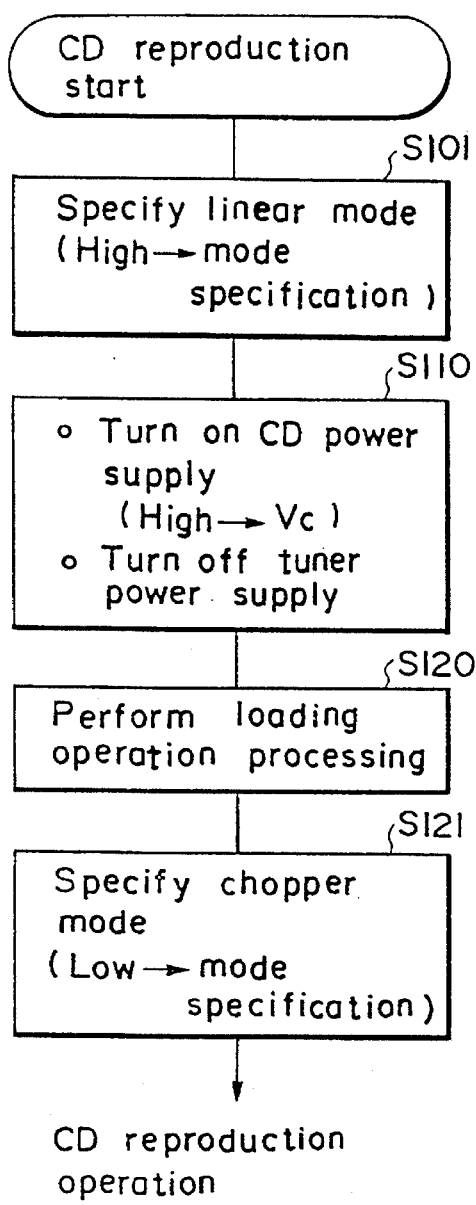
FIG. 10 is a flowchart showing processing of a centralized controller of a tuner and CD player unit to which the present invention is applied.
Figure 10B:
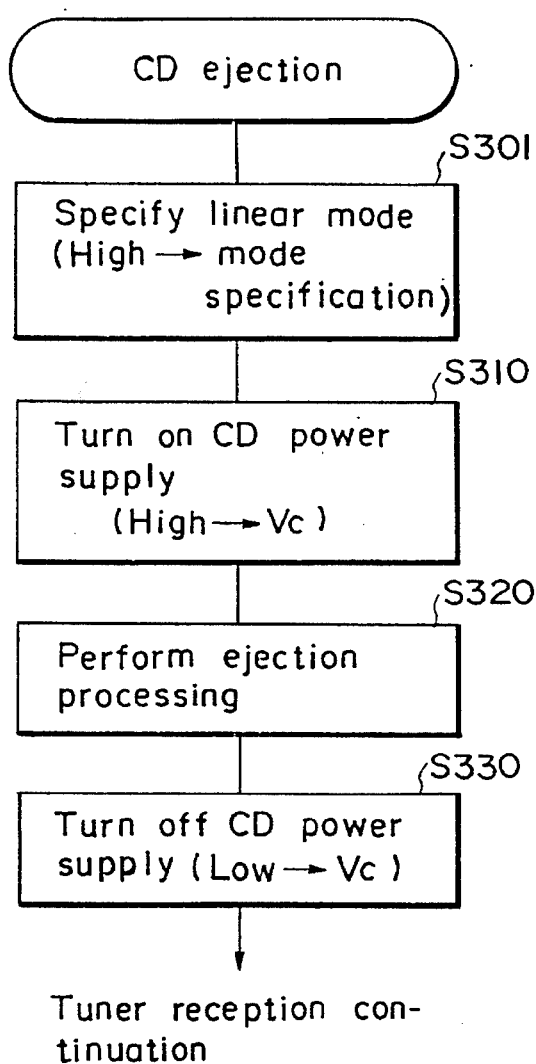

FIGS. 10(a) and 10(b) are used to specifically describe processing of the centralized controller 110a when the principle in (i) is applied to the tuner and CD player unit shown in FIG. 9.

FIGS. 10(a) and 10(b) correspond to centralized controller 110(a), in the same manner as processing corresponding to controller 110 in the former examples shown in FIGS. 5(a) and 5(c) respectively. Processing steps with different step numbers are added. Processing in FIG. 5(b) is common to the present embodiment and the description is omitted.

FIG. 10(a) shows CD reproduction start processing containing loading a disk. Step S101 is added in which the operation mode of the stabilized DC power supply is set to the linear mode before loading operation is started. Also, step S121 is added in which the operation mode is changed to the chopper operation mode before CD reproduction operation is started after the loading operation terminates.

FIG. 10(b) shows processing of the centralized controller 110a for ejection operation during tuner reception. It differs from the former example in that step S301 is added in which the operation mode of the stabilized DC power supply is set to the linear mode before the ejection operation is started.

Embodiment 4:

The main object of the invention is to provide a stabilized DC power supply with two operation modes. Another object of the invention is to switch output voltage of the stabilized DC power supply as well as to change the operation mode for obtaining appropriate voltage conforming to the operation mode. An example is given in which the operation mode of the power supply is selected appropriately for loading (ejection) operation or another type of operation, as described in Embodiment 3 above. Embodiment 3 shows that the linear operation mode is selected for loading or ejection operation. However, because of the linear type, comparatively large consumption current flowing into the loading motor during loading or ejection operation is generated at the power supply input terminal 100 (see FIG. 9) substantially intact. On the other hand, a DC motor can be selected as desired such as a low voltage; large current motor or a high voltage; or low current by changing the winding specifications while maintaining the mechanical output the same. This nature can be used to raise the output voltage of the power supply during loading or ejection with a high voltage, low current motor for reducing consumption current.

Figure 11:
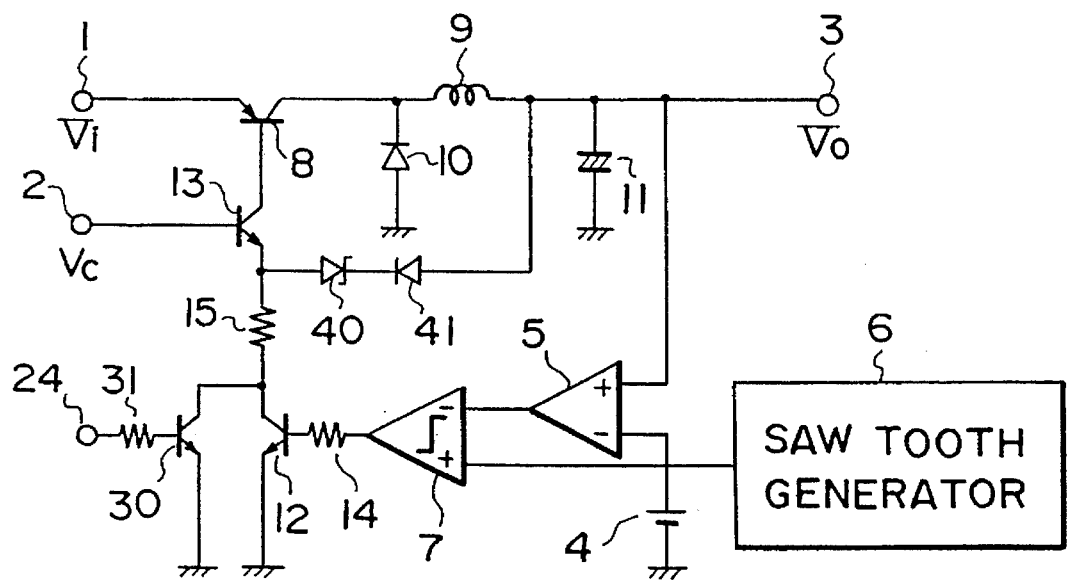
FIG. 11 is a circuit diagram of still another embodiment of a stabilized DC power supply according to the present invention.

Next, an embodiment of the stabilized DC power supply wherein output voltage is also switched at the same time as the operation mode is changed is described using FIG. 11. In FIG. 11, the same parts are designated by the same reference numerals 1–15, 24, 30, and 31 in FIGS. 3, 6, and 8. FIG. 11 differs from FIG. 3 in that the following are added: A switch transistor 30 for inputting a similar mode specification signal 24 as described in Embodiment 2 (FIG. 8), a current setting resistor 31 for the base of the switch transistor 30, and a Zener diode 40 and a diode 41 between the emitter of drive transistor 13 and output terminal 3.

In this circuit, when the mode specification signal 24 is 0 V, the switch transistor 30 is OFF and the same control loop as the former chopper type shown in FIG. 3 (first control loop) exists. Now, assume that the target output voltage at chopper type operation is 7 V, that the breakdown voltage of the Zener diode, $V_z2$, is 4 V, and that the forward voltage of the diode 41 is $V_f$.

In the chopper type operation, assuming that $V_c$ is 5 V, the potential of the emitter of the drive transistor 13 is substantially 5 V $-V_f$ (about 4.3 V) . Therefore, the voltage across the series circuit of the Zener diode 40 and the diode 41 becomes $V_o-5$ V+$V_f$, that is, about 2.7 V. Since the breakdown voltage of the Zener diode 40 is 4 V, the Zener diode 40 is cut off, not affecting the chopper type control loop.

On the other hand, when the mode specification signal becomes 5 V , the switch transistor 30 is turned ON and the same effect occurs as if the drive transistor 12 were always ON, thus the control loop of the chopper type is disconnected. In this state, the series transistor 8 is always turned ON and the output voltage rises. When the output voltage $V_o$ reaches 9 V, the voltage across the series circuit of the Zener diode 40 and the diode 41 becomes 9 V−5 V+$V_f$=4 V+$V_f$ and current flows into the Zener diode 40.

When furthermore the output voltage $V_o$ rises, the current flowing into the Zener diode 40 rises and the voltage applied to the current setting resistor 15 rises. Thus the voltage between the base and emitter of the drive transistor 13 reduces and the emitter current of the drive transistor 13 reduces. At the same time, the collector current of the series transistor 8 also reduces, stopping the output voltage rise. That is, the circuit of the diode 40, Zener diode 41, drive transistor 13, and series transistor 8 makes up a second control loop. Thus, when the mode specification signal is high, the power supply operates as a stabilized DC power supply of the chopper type with the target output voltage 9 V and the output voltage becomes different from that during the chopper type operation ($V_o=7$ V).

Figure 12:
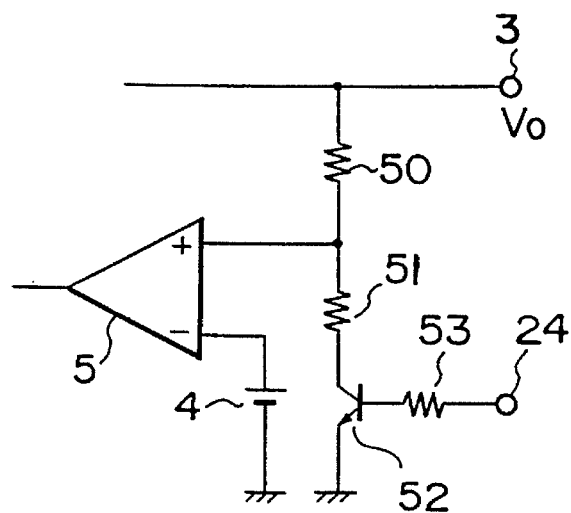
FIG. 12 is a partial circuit diagram showing an example of additional circuit for carrying out another embodiment according to the present invention.

Embodiment 5:

Embodiment 4 is an example in which the output voltage is also switched at the same time as the operation mode of the stabilized DC power supply is changed. Another embodiment is described below. FIG. 12 shows a circuit added to the periphery of the error amplifier 5 of the circuit shown in FIG. 6 or 8 for enabling switching of output voltage. In FIG. 12, the same parts are designated by the same reference numerals 3–5 and 24 in FIGS. 3, 6, and 8.

In FIG. 12, numeral 50 is a split resistor; numeral 51 is a split resistor whose voltage division point with the split resistor 50 is connected to the (+) input terminal of the error amplifier 5; and numeral 52 is a switch transistor; the three being connected in series between the output terminal 3 and ground. Numeral 53 is a current setting resistor making up a base resistor of the switch transistor 52 for inputting the mode specification signal 24. When the mode specification signal 24 is 0 V, the switch transistor 52 is turned OFF and the output voltage $V_o$ is transmitted to the (+) input terminal of the error amplifier 5 intact. This state becomes similar to that in FIG. 6 or 8.

On the other hand, when the mode specification signal 24 is 5 V, that is, the linear type operation mode is selected, the switch transistor 52 is turned ON and the output voltage $V_o$ is divided by means of both split resistors 50 and 51 for transmission to the error amplifier 5. The target output voltage changes to a value of a reciprocal multiple of the division ratio of both split resistors 50 and 51. An alternative method is available as the output voltage switching method itself. For example, reference voltage 4 can be switched for providing two types.

Embodiment 6:

In the above-described embodiments, the selection between the chopper type and the linear control type is effected depending on at least whether or not the loading or ejecting operation is effected in the CD player. According to a sixth embodiment, similar effects can be obtained by selecting between the chopper type and the linear control type depending on whether or not the tuner is in a receiving state. This sixth embodiment is described with reference to FIG. 13.

Figure 13:
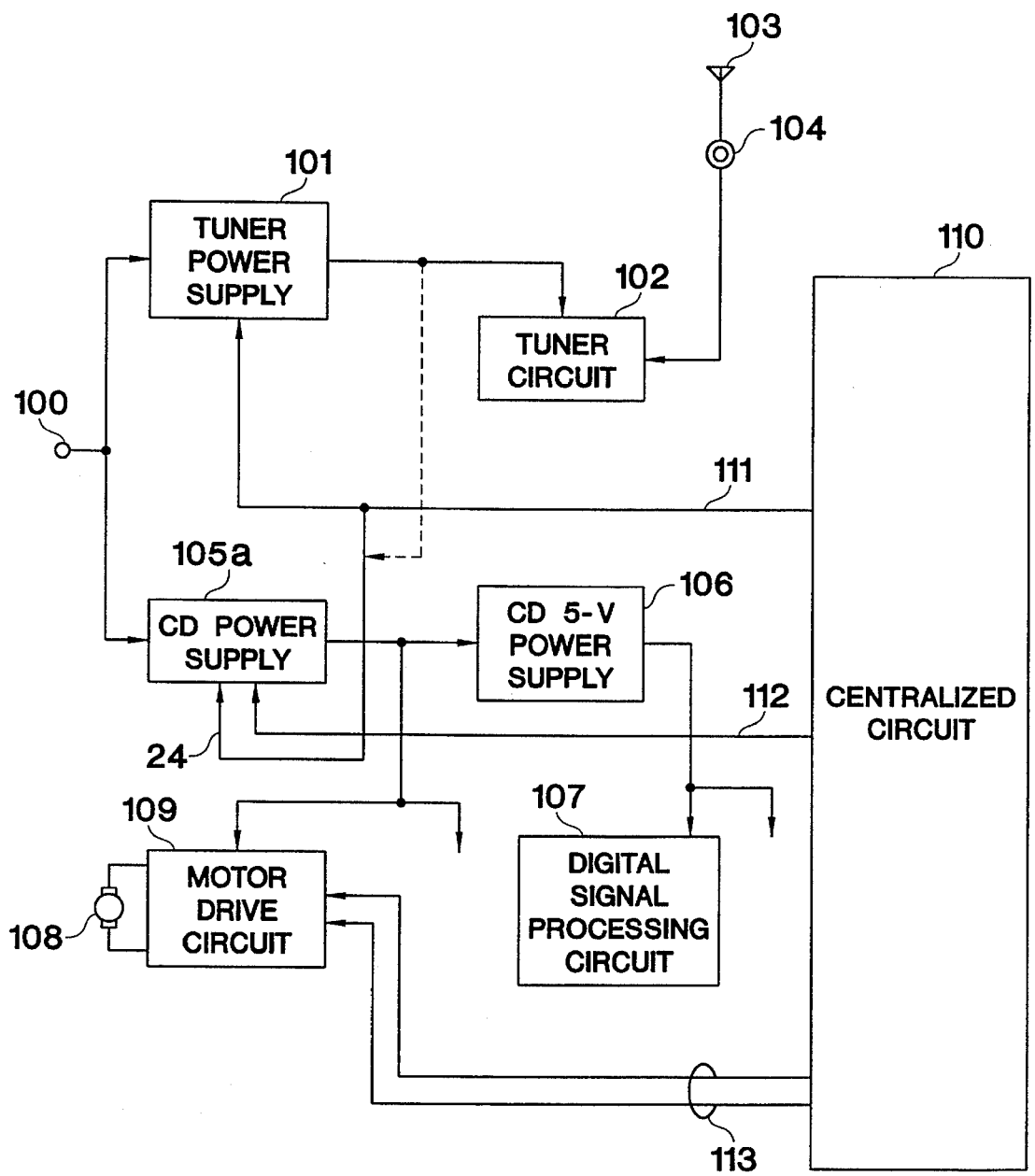

The same reference numerals in FIG. 13 and FIG. 9 represent the same parts. The centralized circuit 110 in FIG. 13 is the same as the prior art centralized circuit 110 in FIG. 1, and realizes the operation shown in FIG. 5.

A main difference between FIG. 9 and FIG. 13 resides in that, in FIG. 13, the tuner power supply control line 111 connected to the output of the centralized circuit 110 is used to transmit the mode specification signal 24 to the CD power supply 105a. A dashed line in FIG. 13 will be described later in detail. For the sake of convenient explanation, it is assumed as an example that the tuner power supply control line 111 is at the High level when an output is taken out from the tuner power supply 101.

In the circuit shown in FIG. 13, based on the description of the prior art examples with reference to FIGS. 1 and 5, and based on the above-defined polarity of the tuner power control line 111, when the tuner is in a reception state, the centralized circuit 110 outputs the High level signal to the tuner power supply control line 111 to turn ON the tuner power supply 101. Simultaneous with this, the mode specification signal 24 supplied to the CD power supply 105a is turned to the High level.

When the disc is ejected during the tuner reception state, the centralized circuit 110 controls the CD power supply control line 112 to turn ON the CD power supply 105a. At this time, the mode specification signal 24 is at the High level as mentioned above, so that the linear type operation mode is selected, resulting in no noise being generated for the tuner.

Next, a case when the state is transferred from the tuner reception state to the CD reproduction state is considered. In the CD reproduction state, the process shown in FIG. 5(a) is carried out. First, the CD power supply 105a is turned ON and the tuner power supply 101 is turned OFF. In order to turn OFF the tuner power supply 101, the tuner power supply control line 111 is turned to the Low level. That is, the mode specification signal 24 is turned to the Low level, so that the CD power supply 105a operates in the chopper type operation mode.

Next, a case when the disc is ejected during a state when the tuner is not in the reception state is considered. In this case, as is apparent from the above assumption, the tuner power supply control line 111, i.e., the mode specification signal 24, is at the Low level. Thus, the operation mode of the CD power supply 105a during the ejecting operation is the chopper type operation mode. Since the tuner is not in the reception state, noise by the CD power supply 105a does not cause any problem.

As described above, by selecting the operation mode of the CD power supply 105a in response to the operating state of the tuner only, the noise for the tuner can be prevented in a similar manner as described in the other embodiments.

In the above-described sixth embodiment, the tuner power supply control line 111 is used as the mode specification signal 24; however, similar operation can be attained by using the output of the tuner power supply 101 as the mode specification signal 24, as shown by the dashed line in FIG. 13. This modification is possible because, when the output of the tuner power supply 101 is a positive voltage of, for example +8 V, the output of the tuner power supply 101 changes with almost the same timing as the changes of the voltage at the tuner power supply control line 111. Thus, the output of the tuner power supply 101 has the same polarity as the polarity of the voltage at the tuner power supply control line 111.

Embodiment 7:

Next, another embodiment is described in which the present invention is applied to a case when a tuner has a data receiving function for receiving data multiplexed with FM broadcasting signal or the like.

In general, FM multiplex broadcasting is practiced in which a new subcarrier is provided in the conventional FM sound broadcasting wave, and digital data such as traffic information, a name of a broadcasting station or the like, are multiplexed in the subcarrier.

The FM multiplex broadcasting is called Radio Data System (RDS) in Europe, and Radio Broadcasting Data System (RBDS) in the United States of America.

In the FM multiplex receiver, there are two cases, i.e., one case in which the receiver selects to receive FM receiving sound as the sound source of the audio system, namely the FM receiving sound is output from the speaker, and another case in which data are received while the reproduced sound from a compact cassette tape recorder or a CD player is selected.

The data reception is carried out when an interruption is effected to the audio system to make the system perform another operation when data of particular contents such as emergency broadcasting are sent in the FM multiplex broadcasting, or when traffic information is to be continuously displayed as characters.

In the radio receiver having such an FM multiplex receiving function, it may happen that the CD player and the tuner are operated simultaneously. When the CD player and the tuner are operated simultaneously, the noise generated by the CD player may be introduced into the tuner when the CD player operates in the chopper type operation mode.

When the tuner is receiving the data, however, the introduction of a considerable amount of noise does not cause a serious problem, because of the following two reasons:

1) Even when a small amount of noise is introduced into sound, the listener catches the noise becoming unpleasant. In contrast, in the data transmission, "1" or "0" is transmitted so that correct data can be transmitted even when a considerable amount of noise is introduced.

2) In the data transmission, error correction codes are added to the data so that errors can be corrected even when a considerable amount of noise is introduced.

Because of the above reasons, when the tuner receives only the data in the FM multiplex, the power supply of the simultaneously operated CD player may be in the chopper type operating mode.

From another point of view, the chopper type operating mode has an effect to suppress the generation of heat because of its small consuming current. Since the number of current-conducting operating circuits in the FM multiplex receiver (i.e., the CD player, the tuner and the FM multiplexing circuits) is larger than that in the conventional FM receiver and CD player, it is desirable to operate under the chopper type operating mode.

An example of this embodiment will be described with reference to FIG. 14, wherein the stabilized DC power supply according to the present invention is applied to a system in which a tuner having the FM multiplex receiving function and a CD player are enclosed in a housing.

Figure 14:
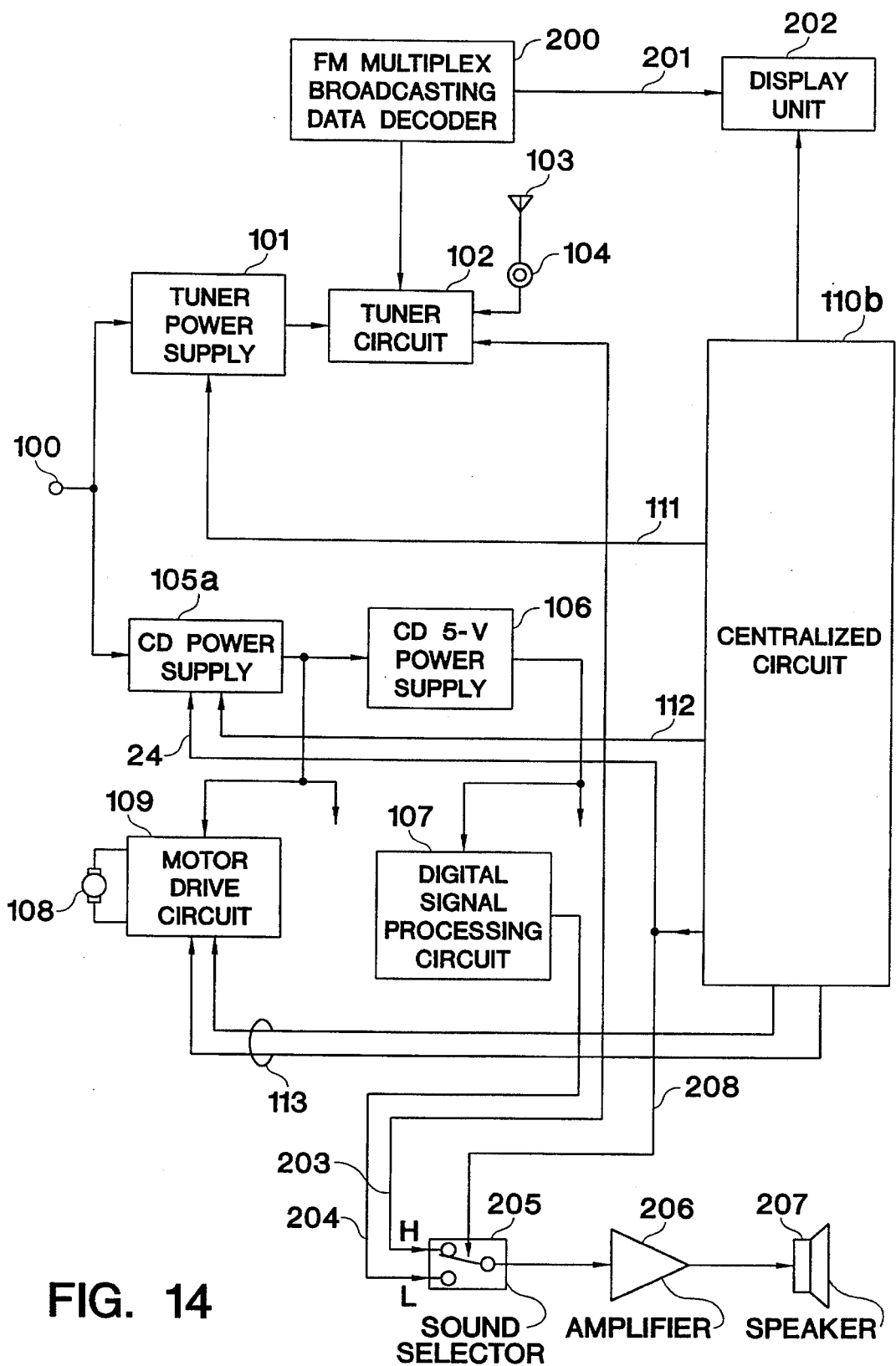

The same reference numerals in FIG. 14 and FIG. 9 represent the same parts.

In FIG. 14, reference numeral 200 denotes an FM multiplex broadcasting data decoder (hereinafter referred to as DCODER) having functions to demodulate the receiving signals obtained from the tuner circuit 102 to obtain FM multiplex signals, to decode the FM multiplex signals and to correct errors. Reference numeral 201 denotes an FM multiplex data line, and 202 denotes a display unit employing an LCD or the like for displaying characters. Detailed description of the operation of the DCODER 200, the FM multiplex data line 201 and the display unit 202 do not directly relate to the main features of the present invention and therefore are omitted here for the sake of brevity.

Reference numerals 203–207 denote parts of blocks which are also inherently present in the system shown in FIG. 9 but are omitted from FIG. 9. Reference numeral 203 represents an FM sound signal, 204 a CD sound signal, 205 a sound selector, 206 an amplifier, and 207 a speaker. The sound selector 205 selects the sound source to be output to the speaker 207.

Reference numeral 208 denotes a sound selecting signal by which the sound selector 205 selects the sound to be output to the speaker 207. As an example, it is assumed here that the FM sound is selected when the sound selecting signal is at the High level, and the CD sound is selected when the sound selecting signal is at the Low level. It should be noted that the sound selecting signal is also used as the mode specification signal 24 for the CD power supply 105a.

Reference symbol 110b is a centralized circuit constructed by a so-called microprocessor or the like. Processes in the centralized circuit 110b are slightly different from those in the centralized circuit 110 shown in FIG. 1 or the centralized circuit 110a in the other embodiments shown in FIG. 9 because the FM multiplex receiving function is added to the centralized circuit 110b. The operations in the centralized circuit 110b, however, do not directly relate to the main features of the present invention, and therefore the description thereof is omitted here for the sake of brevity.

In the following, a description is made as to the selection of the sound source and the ON/OFF control of each power supply. It should be noted that the basic processes are almost the same as those in the prior art example shown in FIG. 1.

FIG. 15 is a table showing a rule under which the centralized circuit 110b determines the state of each control line.

For example, No. 1 in the table shows a case in which only the CD player is in a reproduction state, and the FM multiplex receiving is not effected. In this case, the FM sound and the FM multiplex data are not necessary so that the tuner power supply control line 111 is turned to the Low level to turn OFF the tuner power supply 101.

The operating modes of the CD power supply 105a are shown on the right side of the table. Briefly, when the FM sound is selected to be output to the speaker, the CD power supply 105a operates under the linear type operation mode.

In conclusion, when the FM sound is selected, the CD power supply 105a operates under the linear type operating mode because even a small amount of noise causes a problem in the reception of the FM sound. In contrast, when the FM multiplex data is received, the CD power supply 105a operates under the chopper type operating mode because even a considerable amount of noise does not cause a serious problem in the reception of the FM multiplex data.

In the above-mentioned embodiments, a tuner and CD player unit is taken as an example. The embodiments are also applicable substantially to a digital audio tape deck and tuner unit as well as any other electronic device which has capabilities of loading and ejecting an information recording medium. The embodiments use a single bipolar element as the series regulator. However, a field effect transistor (FET) also provides a similar effect and a composite element such as a Darlington connection can replace the single bipolar element. The mode specification signal 24 may be any signal which conforms to the operation state of an electronic device, and is interpreted in a wide sense in the invention.

Therefore, according to the invention, the switching control system of the chopper type or the linear control system can be selected for operation of a stabilized DC power supply used in an electronic device according to the operation mode of the electronic device. Thus, the switching type feature of small heating and power consumption or the linear type feature of noise suppression can be selected properly. Further and more particularly an electronic device which contains a circuit sensitive to noise and a power supply handling large power in a single cabinet can be easily designed.

If the power supply of the invention is used as a stabilized DC power supply for an electronic device which has a drive mechanism of moving an information recording medium with a motor, a noise problem is removed by operating only a series regulator at ejection operation during tuner reception.

Since the power supply of the invention operates as former in the chopper control system and has a smoothing circuit inserted for the linear control system, a switch can be made to the linear control system simply by adding a simple circuit; a stabilized DC power supply of simple configuration can be provided at a low price.

Since the power supply of the invention has first and second control loops for selecting the chopper control system or linear control system, proper control loop operation can be designed easily because of the separate control loops.

Furthermore, since the output voltage as well as the operation mode is switched, flexibility of design increases.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stabilized direct current power supply for supplying power to an electronic device capable of loading and ejecting an information recording medium, comprising:
    a series transistor inserted in series between a power supply input terminal receiving a direct current power supply and an output terminal for supplying power to the electronic device; and
    selection means, responsive to an operation mode signal of the electronic device, for selecting a state in which direct current stabilization of a chopper type is performed in conjunction with said series transistor in response to the operation mode signal not indicating a desired loading or ejecting operation and for selecting a state in which direct current stabilization of a linear control type is performed by operating said series transistor as a linear amplifier in response to the operation mode signal indicating a desired loading or ejecting operation.

2. A stabilized direct current power supply as claimed in claim 1 wherein said series transistor includes one of a single bipolar element and a field effect transistor.

3. A stabilized direct current power supply as claimed in claim 1 wherein said series transistor includes a composite element of a Darlington connection.

4. A stabilized direct current power supply as claimed in claim 1, 2, or 3 wherein the electronic device includes a drive mechanism for moving the information recording medium by means of a motor.

5. A stabilized direct current power supply as claimed in claim 1, 2, or 3, further comprising:
    a pulse converter, responsive to an output voltage value, for generating a pulse signal; and
    a smoothing circuit, an output of said pulse converter being added to said series transistor for performing direct current stabilization operation of the chopper type and said smoothing circuit for smoothing output pulses of said pulse converter, being operated in response to the operation mode signal of an electronic device for performing direct current stabilization operation of the linear control type.

6. A stabilized direct current power supply as claimed in claim 4, further comprising:
    a pulse converter, responsive to an output voltage value, for generating a pulse signal; and
    a smoothing circuit, an output of said pulse converter being added to said series transistor for performing direct current stabilization operation of the chopper type and said smoothing circuit, for smoothing output pulses of said pulse converter being operated in response to the operation mode signal of an electronic device for performing direct current stabilization operation of the linear control type.

7. A stabilized direct current power supply as claimed in claim 1, 2, or 3, further comprising:
    a pulse converter, responsive to an output voltage value, for generating a pulse signal;
    a first control loop for adding an output of said pulse converter to said series transistor for performing direct current stabilization operation of the chopper type;
    a second control loop, functioning responsive to said output voltage value, for linearly controlling a control signal of said series transistor; and
    switch means for selecting one of said first and second control loop.

8. A stabilized direct current power supply as claimed in claim 4, further comprising:
    a pulse converter, responsive to an output voltage value, for generating a pulse signal;
    a first control loop for adding an output of said pulse converter to said series transistor for performing direct current stabilization operation of the chopper type;
    a second control loop, functioning responsive to said output voltage value, for linearly controlling a control signal of said series transistor; and
    switch means for selecting one of said first and second control loop.

9. A stabilized direct current power supply as claimed in claim 5, further comprising:
    a pulse converter, responsive to an output voltage value, for generating a pulse signal;
    a first control loop for adding an output of said pulse converter to said series transistor for performing direct current stabilization operation of the chopper type;
    a second control loop, functioning responsive to said output voltage value, for linearly controlling a control signal of said series transistor; and
    switch means for selecting one of said first and second control loop.

10. A stabilized direct current power supply as claimed in claim 6, further comprising:
    a pulse converter, responsive to an output voltage value, for generating a pulse signal;
    a first control loop for adding an output of said pulse converter to said series transistor for performing direct current stabilization operation of the chopper type;
    a second control loop, functioning responsive to said output voltage value, for linearly controlling a control signal of said series transistor; and
    switch means for selecting one of said first and second control loop.

11. A stabilized direct current power supply as claimed in claim 1, 2, or 3 further comprising:
    means for selecting one of a state in which direct current stabilization operation of the chopper type is performed and a state in which direct current stabilization operation of the linear control type is performed; and
    output switch means for switching an output voltage according to the selected state.

12. A stabilized direct current power supply as claimed in claim 4 further comprising:
    means for selecting one of a state in which direct current stabilization operation of the chopper type is performed and a state in which direct current stabilization operation of the linear control type is performed; and output switch means for switching an output voltage according to the selected state.

13. A stabilized direct current power supply as claimed in claim 5, further comprising:

means for selecting one of a state in which direct current stabilization operation of the chopper type is performed and a state in which direct current stabilization operation of linear control type is performed; and output switch means for switching an output voltage according to the selected state.

14. A stabilized direct current power supply as claimed in claim 6, further comprising:

means for selecting one of a state in which direct current stabilization operation of the chopper type is performed and a state in which direct current stabilization operation of linear control type is performed; and output switch means for switching an output voltage according to the selected state.

15. A stabilized direct current power supply as claimed in claim 7, further comprising:

means for selecting one of a state in which direct current stabilization operation of the chopper type is performed and a state in which direct current stabilization operation of linear control type is performed; and output switch means for switching an output voltage according to the selected state.

16. A stabilized direct current power supply as claimed in claim 8, further comprising:

means for selecting one of a state in which direct current stabilization operation of the chopper type is performed and a state in which direct current stabilization operation of linear control type is performed; and output switch means for switching an output voltage according to the selected state.

17. A stabilized direct current power supply as claimed in claim 9, further comprising:

means for selecting one of a state in which direct current stabilization operation of the chopper type is performed and a state in which direct current stabilization operation of linear control type is performed; and output switch means for switching an output voltage according to the selected state.

18. A stabilized direct current power supply as claimed in claim 10, further comprising:

means for selecting one of a state in which direct current stabilization operation of the chopper type is performed and a state in which direct current stabilization operation of linear control type is performed; and output switch means for switching an output voltage according to the selected state.

19. A stabilized direct current power supply for supplying power to an electronic device capable of loading and ejecting an information recording medium, said electronic device and a tuner being included in a common housing, comprising:

first means, including a power supply, for supplying power by direct current stabilization of a chopper type;

second means, including said power supply, for supplying power by direct current stabilization of a linear control type; and selection means for selecting one of the first and second means in response to a state of the tuner, the first means being selected when the tuner is not operating in a reception state, and the second means being selected when the tuner is operating in a reception state.

20. The stabilized direct current power supply of claim 1, wherein said selection means does not select said state in which direct current stabilization of a linear control type is performed unless a signal indicative of the tuner reception is also received by the selection means.

21. A stabilized direct current power supply for supplying power to an electronic device capable of loading and ejecting an information recording medium, said electronic device and a tuner being included in a common housing to form an audio system, and a sound output of said audio system being selected between an audio source from said electronic device and an audio source from said tuner, comprising:

first means, including a power supply, for supplying power by direct current stabilization of a chopper type;

second means, including said power supply, for supplying power by direct current stabilization of a linear control type; and selection means for selecting one of the first and second means in response to a state of the tuner, the first means being selected in response to the sound output of said audio system not being selected to be from the tuner, and the second means being selected in response to the sound output of said audio system being selected to be from the tuner.

22. A stabilized direct current power for supplying power to an electronic device capable of loading, ejecting and reading an information recording medium, said electronic device and a tuner being included in a common housing, comprising:

first means, including a power supply, for supplying power by direct current stabilization of a chopper type;

second means, including said power supply, for supplying power by direct current stabilization of a linear control type; and selection means for selecting one of the first and second means in response to a state of the electronic device, said first means being selected in response to said electronic device being in a reading state for reading the information recording medium, and said second means being selected in response to the electronic device being in a loading or ejecting state for loading or ejecting of the recording medium.

23. A stabilized direct current power supply for supplying power to an electronic device capable of loading and ejecting an information recording medium, said electronic device and a tuner being included in a common housing, comprising:

first means, including a power supply, for supplying power by direct current stabilization of a chopper type;

second means, including said power supply, for supplying power by direct current stabilization of a linear control type;

a tuner power supply for supplying power to the tuner; and selection means for selecting one of the first and second means in response to a state of the tuner power supply, the first means being selected when the tuner power supply is ON, and the second means being selected when the tuner power supply is cut off.

* * * * *